Aug. 30, 1949.　　　W. H. ORME　　　2,480,336
PHOTOFLASH SYNCHRONIZER FOR CAMERAS
Filed Aug. 8, 1945
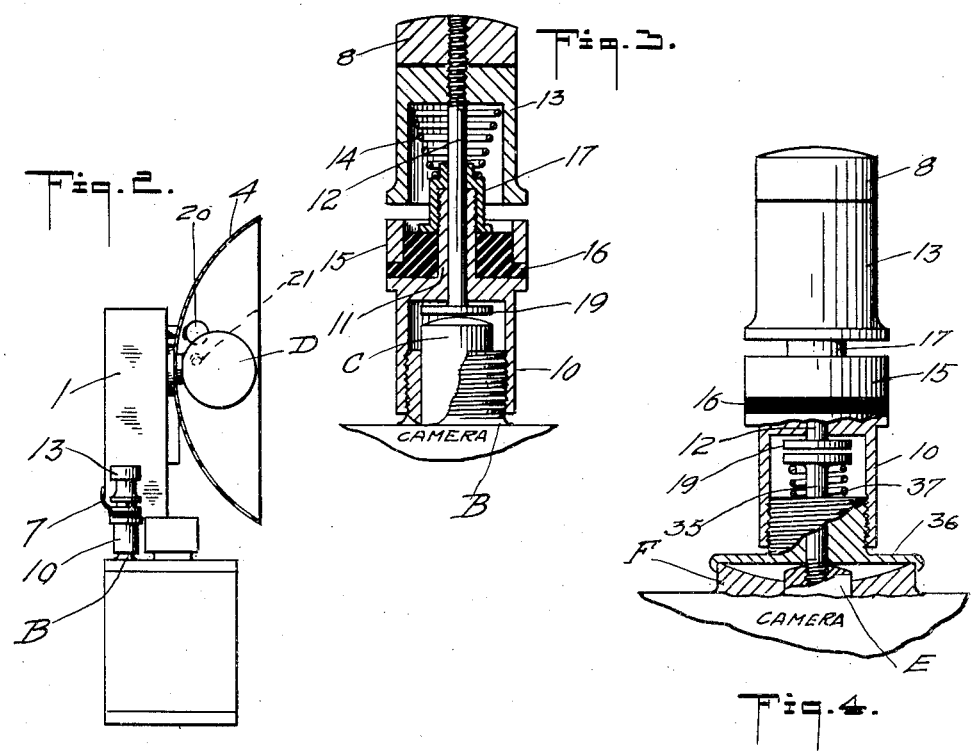
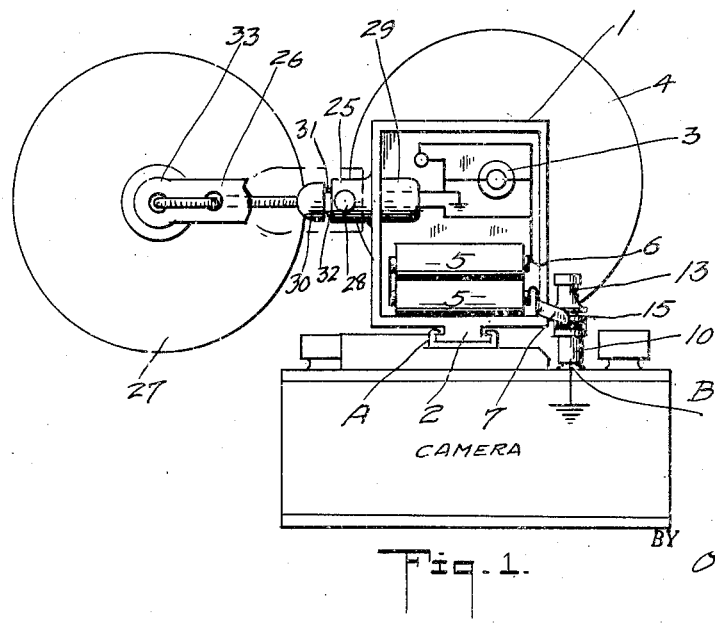
INVENTOR:
W. H. ORME
BY
ATTORNEY.

Patented Aug. 30, 1949

2,480,336

UNITED STATES PATENT OFFICE 2,480,336

PHOTOFLASH SYNCHRONIZER FOR CAMERAS

Wilfrid H. Orme, Los Angeles, Calif., assignor of one-half to Clarence Schwiebert, Roscoe, Calif.

Application August 8, 1945, Serial No. 609,615

1 Claim. (Cl. 95—11.5)

This invention relates to cameras and more particularly to a flash light synchronizing device for attachment to such cameras.

It is the general object of my invention to provide a simple and inexpensive flash light attachment. A further object is to provide an attachment of this character which may readily be attached to various types of cameras without in any way changing or interfering with any part or parts of such camera or the operation thereof. It is a further object to provide simple means for visually testing the batteries employed to energize the flash light circuit of the invention. Another object is to provide means for supplying additional volume of flash light to the device when needed.

The structural combinations of my invention and the methods of operation thereof together with the many advantages thereof will be readily understood from the following description, particularly when read in connection with the accompanying drawings, of which:

Fig. 1 is a rear view of my device as it appears when mounted in position on a camera and with the casing cover thereof removed for the sake of clearness;

Fig. 2 is a substantially corresponding end elevational view showing the more essential features of Fig. 1;

Fig. 3 is a detail view, on a larger scale, in which is shown a preferred method of attaching the synchronizing member of the device to the camera; and Fig. 4 is a similar detail view illustrating a modified method of mounting the synchronizing member on a different make of camera.

The structure of my invention is in the first instance shown attached to the well known "Leica" camera which, on its top surface, is fitted with a guide A and is adjacent this guide made with an externally threaded boss B, within which the shutter actuating button C is axially slidable. The device of my invention is attached to these two members, the guide and the boss, and no other part of the camera is disturbed.

The device comprises a casing 1 which, on its bottom surface is fitted with a shoe 2 for insertion into the guide A to maintain the casing in position on the camera. Within the casing is a conventional flash bulb receiving member 3, which extends through the front wall thereof to take the usual position within a conventional reflector 4, and it is adapted to support a conventional flash bulb D. One or more batteries 5, are placed at the bottom of the casing and should be insulated therefrom, as in practice. From one battery terminal extends a conductor 6 to a terminal of the member 3. The other terminal of this member is grounded through the walls of the casing and the camera. As such connections are common in electrical devices, they are not further herein illustrated. A contact finger 7 projects out of the casing from the other battery terminal. This finger should, of course, also be insulated from the casing and it is operatively connected to control and synchronize the flash with the movement of the camera shutter in the following manner.

The operating mechanism for the actuating button C comprises an annular frame 10 seated on the screw threads of the boss B, and an annular guide 11 rising from the top of said frame slidably to support a stem 12 in axial alignment with the actuating button. For convenient operation, this stem is shown fitted with a screw cap 13 and a spring 14 may be seated on the upper surface of the guide 11 to assist in yieldingly maintaining the stem in the elevated position shown in the drawings. An annular contact member 15 is seated on an insulating sleeve 16 and both are suitably fastened to the cap 10, as by a threaded sleeve 17 engaging the upper end of the guide 11.

As shown in Figs. 1 and 2 the finger 7 extends from the casing to the contact member 15 but, as this member is insulated from the cap 10, the circuit through the flash bulb member 3 remains dormant. The moment, however, that the cap 13 is depressed until it comes to a stop against the contact member 15, it is seen that a circuit from the batteries is closed through the finger 7, the stem 12, cap 10 and through the walls of the camera and casing 1, the member 3 and conductor 6 back to the batteries, when the flash bulb D is seated in the member 3.

The stem 12, as illustrated, terminates at the bottom in a head 19, in contact with or at least very close to the upper surface of the actuating button C. It follows that a depressive movement of the stem is communicated to the button and that, as a result, the shutter movement becomes synchronized with the operation of the flash bulb. The stem 12 should be axially adjustable relative to the button C so that perfect synchronization may be attained and it is, for this purpose, shown threaded through the cap 13. When correctly adjusted, the parts are locked in position by a check nut 8.

In order to save space and so to make the device as compact as possible, very small "penlite"

type of batteries are used. The life of such small batteries is quite limited and it often happens in devices of this character that the batteries are dead at the very moment they are most urgently needed and so defeat the very purpose of the flash light combination. In order to safeguard against such occurrence, I mount a test bulb 20 within the reflector.

This bulb is cut into the battery circuit and it is energized, before the flash bulb is placed in its socket, by depressing the stem 12. It should be clear to anyone familiar with the art that such test bulb is of considerable importance, not only to check the batteries, but also as an aid in focusing, to throw a fine beam of light on the object to be photographed. Furthermore, when small opening 21 is made in the reflector, directly below this bulb, it is found that the front of the lens casing becomes sufficiently illumined clearly to read the setting scales thereon.

It is frequently found that an additional flash bulb is essential to proper lighting of the objects to be photographed and such additional light may be added in the following manner. A bracket 25 is shown fastened to the side of the casing 1 to receive the arm 26 of a reflector 27, and a thumbscrew 28 may clamp the arm in position. Within this bracket is seated a conventional socket 29 to receive the plug 30 of conductors 31, 32 leading to a flash lamp attachment 33. When not needed, this additional light is readily detached.

In cameras of the well known "Contax" type, the shutter actuating button E is seated below the top surface of a boss F, see Fig. 4, and the latter is not provided with external screw threads such as support the cap 10. The button E is, however internally threaded. The casing 1, of my invention, is attachable to such cameras substantially as above described, and it is merely required to provide simple means for adapting the above button control for attachment to the Contax camera. Illustrative of such adapting means, I have, in Fig. 4, shown a threaded stem 35 seated in the screw threads of the shutter actuating button E. This stem is guided in a shouldered base 36 which, in turn, rests on the boss F of the camera. The shoulder of the base is shown made with screw threads of the proper diameter to receive the cap 10. When the top of the stem is so adjusted in the boss F that it holds the same relation thereto which the button C holds to the stem 12, it is seen that the entire button control combination above described may be mounted on the base 36 and that it will function in exactly the same manner. A spring 37 is placed between the head of the stem and the top surface of the base more securely to maintain the latter in position on the boss F.

I am aware that other flash light synchronizing devices for attachment to cameras are in commercial use, but I know of no such device which is entirely self-contained and may be mounted and detached without in any way interfering with or modifying some parts of such cameras. I do not, however, wish to be limited to the exact shapes, proportions and arrangements shown and described, but reserve the right to make further modifications thereof within the scope of the claim hereto appended.

I claim:

In a shutter and flash light synchronizing device, the combination with a camera having an externally threaded boss at the top thereof and a depressible shutter actuating button within said boss, of a casing attachable to the camera, a flash light battery within said casing, an annular frame having internal screw threads seatable on the threads of said boss and an externally threaded tubular guide rising from said frame, a plunger slidable in said guide to depress the said button, the upper end of said plunger being threaded, an annular recessed insulating sleeve seated on the frame and encompassing said guide, a screw cap seated on the threads of the guide to maintain said insulating sleeve in position on the frame, an annular contact member seated in the recess of the insulating sleeve, a second contact member seated on the screw threads of the stem for axial adjustment relative to said annular contact member, a lock nut clamping said second contact member in adjusted position on the stem, and a conductor element extending from one battery terminal to said annular contact member, depression of the plunger to depress the shutter actuating button closing the battery circuit through the two contact members.

WILFRID H. ORME.

REFERENCES CITED

The following references are of record in the file of this patent:

UNITED STATES PATENTS

| Number | Name | Date |
|---|---|---|
| 1,858,691 | Stroecker | May 17, 1932 |
| 1,997,315 | Schwartz | Apr. 9, 1935 |
| 2,224,674 | Filsinger | Dec. 10, 1940 |
| 2,262,215 | Ulm | Nov. 11, 1941 |
| 2,282,850 | Brownscombe | May 12, 1942 |
| 2,298,403 | Mihalyi | Oct. 13, 1942 |
| 2,308,017 | Mihalyi | Jan. 12, 1943 |
| 2,311,440 | Jacobson | Feb. 16, 1943 |
| 2,317,465 | Kende et al. | Apr. 27, 1943 |
| 2,326,364 | King | Aug. 10, 1943 |

FOREIGN PATENTS

| Number | Country | Date |
|---|---|---|
| 163,570 | Switzerland | Aug. 31, 1933 |